Oct. 22, 1935.　　　　　G. A. AULL　　　　2,018,481
PRECISION CHANNEL GAUGE
Filed Jan. 31, 1935
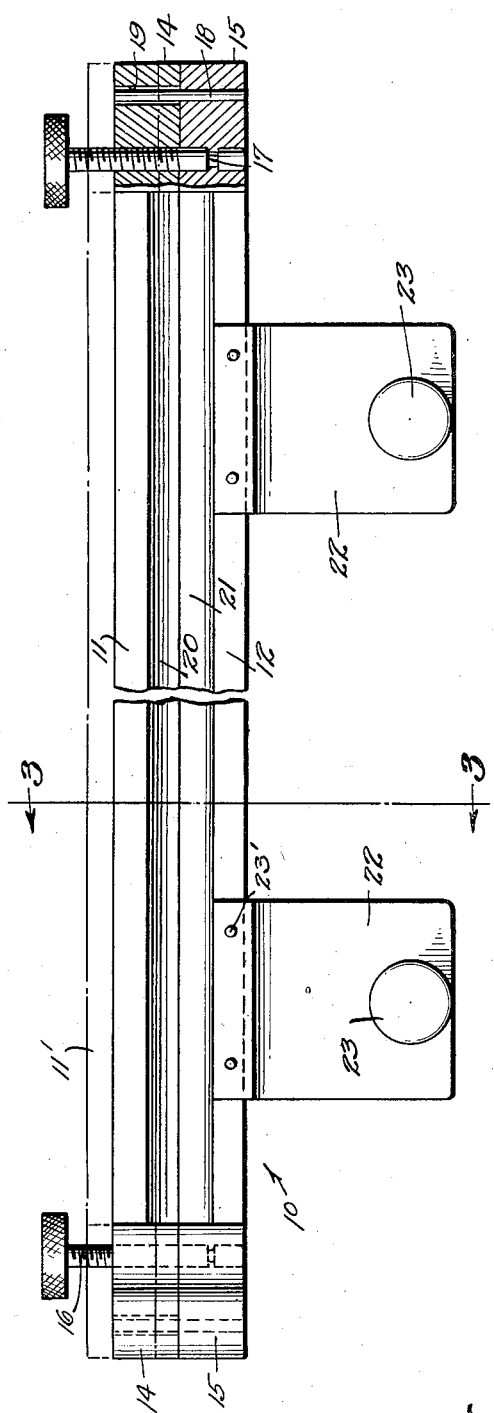
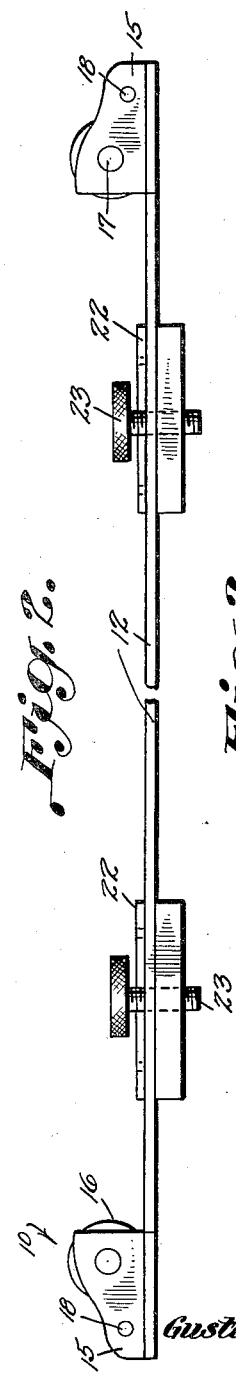
Inventor
Gustavus A. Aull
By Miller & Miller
Attorneys Patented Oct. 22, 1935

2,018,481

UNITED STATES PATENT OFFICE 2,018,481

PRECISION CHANNEL GAUGE

Gustavus A. Aull, Nyack, N. Y.

Application January 31, 1935, Serial No. 4,356

4 Claims. (Cl. 93—58)

This invention relates to a precision channel gauge and has for an object to provide a gauge especially intended for use in providing exact and uniform creases for folding cartons and fiber or corrugated shipping cases when being made by being cut and creased on a platen or cylinder press. A gauge of this invention may be manufactured to fit the radii of any cylinder as well as horizontal and flat presses.

Previous to this invention it has been difficult if not impossible to provide exact creasing of corrugated or fiber shipping boxes, as well as in folding cartons.

With this invention, the gauge may open anywhere from zero to a half inch to set for the channel for creasing from paper thickness to thickness of one-eighth of an inch on any kind of box board. The use of the gauge of this invention insures to a far greater degree the accuracy of the creasing and thus provides a better quality of carton, eliminating the difficulty, formerly present, of line-up. Further, this invention cuts down the excessive make-ready time when cutting out the creases and lining it up.

With the foregoing and other objects in view, as will hereinafter become apparent, this invention comprises the constructions, combinations and arrangements of parts, hereinafter set forth, disclosed and shown on the accompanying drawing. In this drawing, Figure 1 is a plan view of the invention, Figure 2 is a side elevation of the same, and Figure 3 is a sectional view taken on the line 3—3 of Figure 1.

There is shown at 10 the precision channel gauge of this invention, which is intended for use in providing exact and uniform creases when folding cartons and fiber or corrugated shipping cases. This gauge 10 includes a pair of flat bars 11 and 12.

A pair of metal blocks 14 are secured one at each end to the flat bar 11 and another pair of metal blocks 15 are secured one at each end to the flat bar 12. These blocks 14 and 15 provide means for receiving a threaded thumb bolt 16 threaded through one of the blocks as through 14 and rotatably secured by means of a recessed neck 17 in the other of the blocks 15.

A guide pin 18 is secured in one of these blocks as block 15 and extends through an aperture 19 in the other of the blocks 14, this same thumb bolt 16 and guide pin 18 being placed in each pair of blocks 14 and 15. Each of the flat bars 11 and 12 is bevelled on one side, said sides opposing each other as at 20 and 21, the sharper edges of the bevel being adapted to be brought into contact with each other, as shown in full line in Figure 1, when the thumb bolts 16 are so operated as to cause the flat bars 11 and 12 to approach into contact with each other.

Reversing the direction of rotation of the thumb bolts 16, may cause the bar 11 to recede from the bar 12 a distance as much as one-half inch to the position shown in dot dash outline 11'. The bar 12 may be provided with a pair of finger rests 22 secured in any suitable manner thereto as at 23. Extending through each of the finger rests 22 is a threaded thumb bolt 23 to assist in properly positioning the gauge.

While the invention as thus disclosed and described is intended for a flat press, it may equally be used with a curved shaped press roll by appropriately curving the necessary parts, that is the bars 11 and 12, instead of extending flat will be curved, like a part of the circumference of a sector corresponding to the curvature of the roll on which it will be used.

The novel features and the operation of this device will be apparent from the foregoing description. While the device has been shown and the structure described in detail, it is obvious that this is not to be considered limited to the exact form described, but that changes may be made therein within the scope of what is claimed without departing from the spirit of the invention.

Having thus set forth and disclosed the nature of this invention, what is claimed is:

1. A precision channel gauge comprising a pair of flat bar members lying side by side in the same plane, the adjacent edge of each bar member adjacent to the other bar member being bevelled, and means for securing said bar members in said plane for a limited adjustment relative to each other.

2. A precision channel gauge comprising a pair of flat bar members lying side by side in the same plane, the adjacent edge of each bar member adjacent to the other bar member being bevelled, and means for securing said bar members in said plane for a limited adjustment relative to each other, said means including a pair of block members, for each bar member, one block member being secured at each end of the bar member, and a thumb bolt rotatably secured in one of said block members and threaded through the other of said block members.

3. A precision channel gauge comprising a pair of flat bar members lying side by side in the same plane, the adjacent edge of each bar member adjacent to the other bar member being bevelled, means for securing said bar members in said plane for a limited adjustment relative to each other, said means including a pair of block members for each bar member, one block member being secured at each end of the bar member, a thumb bolt rotatably secured in one of said block members and threaded through the other of said block members, and a pin member in one of said block members, the other of said block members having an aperture to receive and guide said pin member.

4. A precision channel gauge comprising a pair of flat bar members lying side by side in the same plane, the adjacent edge of each bar member adjacent to the other bar member being bevelled, means for securing said bar members in said plane for a limited adjustment relative to each other, said means including a pair of block members for each bar member, one block member being secured at each end of the bar member, a thumb bolt rotatably secured in one of said block members and threaded through the other of said block members, a pin member in one of said block members, the other of said block members having an aperture to receive and guide said pin member, and a pair of thumb rests on one of said bar members, said thumb rests comprising a flat block secured to said bar member, and a threaded thumb bolt extending through said flat block.

GUSTAVUS A. AULL.